No. 64,874.  PATENTED MAY 21, 1867.
E. HOWARD.
METHOD OF MAKING BALANCE WHEELS FOR WATCHES, &c.
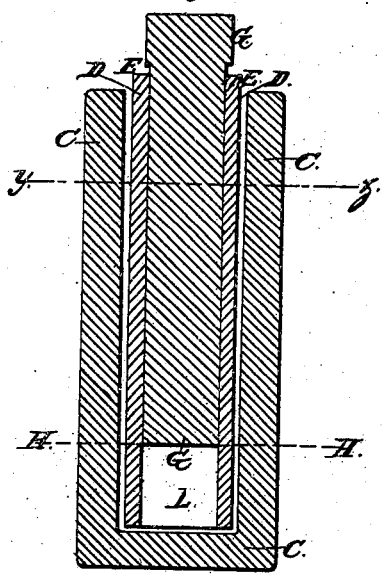
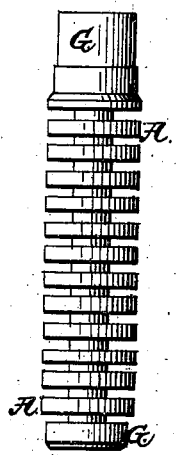
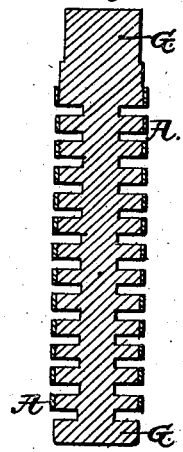
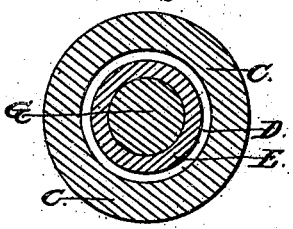
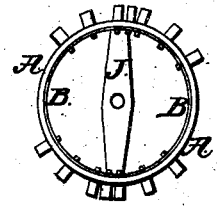
Witnesses:  Inventor:
Edward Howard

United States Patent Office.

EDWARD HOWARD, OF BOSTON, MASSACHUSETTS.

Letters Patent No. 64,874, dated May 21, 1867.

---

IMPROVED METHOD OF MAKING BALANCE-WHEELS FOR WATCHES, &c.

---

*The Schedule referred to in these Letters Patent and making part of the same.*

---

TO ALL WHOM IT MAY CONCERN:

Be it known that I, EDWARD HOWARD, of Boston, in the county of Suffolk, and State of Massachusetts, have invented a new and useful improvement in the "Manufacture of Balance-Wheels of Watches;" and I do hereby declare that the following is a full and exact description thereof, reference being had to the accompanying drawings and to the letters and figures marked thereon.

Figure I is a vertical section of a crucible, a brass tube, and a steel rod.
Figure II, horizontal section on the line y r.
Figure III, front view of steel rod and the steel and brass disks.
Figure IV, vertical section of same.
Figure V, balance-wheel completed.

My improvement does not relate to the form or shape of a balance for chronometers, watches, and clocks, but it consists in a new mode or method of manufacturing balances of the common construction. One of these wheels is represented at Fig. V, and the improvement herein described is embraced mainly in the brass and steel rings A and B, which are firmly united to each other in a simple and effective manner, and at much less cost than by the process in common use. Watch-balances have usually been made by forming a circular cavity in plumbago, of a little larger diameter than the size of the balance-wheel, and placing in the centre of the cavity a steel button or disk of about the thickness that the balance is required to be made. Filings and scraps of brass are then placed in the annular cavity around the steel disk; the whole is then exposed to sufficient heat to melt the brass and cause it to adhere to the periphery of the steel disk. When made in this way, many of the wheels are worthless, and must be rejected on account of the want of perfect adhesion of the two metals. To produce a good balance the brass requires to be hardened by hammering, and during this process it is liable to start up and peel off from the steel. This want of adhesion is chiefly due to the oxidation of the steel when the heat is applied to it. By my process the air is excluded, the bright surfaces of the brass and steel being in close contact until the brass is melted. By the use of my improvement a large number of buttons or disks are cut from the same rod, all of which are precisely alike, having been subjected to but one uniform heat.

I first provide a crucible, C, Fig. I, about four or five inches deep, nearly cylindrical, and of such diameter that its inner surface will be nearly in contact with the brass tube E, which is to be melted and form the exterior ring A, Figs. IV and V, of the balance. The brass tube may be three or four inches long, and it is highly polished on the inside. The steel rod or cylinder G is turned smooth, and after being heated to drive off moisture is coated with a strong solution of borax. It is then driven into the polished tube E, thus bringing the surfaces of the brass and steel in close contact and preventing their exposure to air. The steel cylinder is not driven to the bottom of the tube, the space L, Fig. I, being left vacant. When the tube melts the cylinder G settles down, and the brass that was below the level H fills the circular cavity D between the outside of the tube and the inside of the crucible, and thus keeps the melted brass at a higher level with reference to the central tube G. When cold the crucible is broken and the steel rod with its brass coating is taken out. It is then placed in the lathe (on the same centres used for turning the steel rod before it was coated) and the brass is turned down to the size required for the periphery of the balance. It is then sawed or turned, as in Figs. III and IV, into disks or buttons of suitable breadth, thus producing a large number of disks, with but one melting, and all having exactly the same thickness of brass, which adheres firmly to the metal, and will not start up when it is hardened by hammering. The inner steel rim B, Fig. V, and the centre bar J, are then finished in the usual manner.

What I claim, and desire to secure by Letters Patent, is—

The process or mode of making a series of balance-wheel disks or buttons by the use of the crucible, the brass tube, and the steel rod, substantially as herein described and for the purpose specified.

EDWARD HOWARD. [L. S.]

Witnesses:
THOS. P. PROCTOR,
W. W. WARREN.